April 19, 1938. W. BIRD ET AL 2,114,897
TIME CONTROLLED PARACHUTE RELEASE DEVICE
Filed Feb. 6, 1936 2 Sheets-Sheet 2
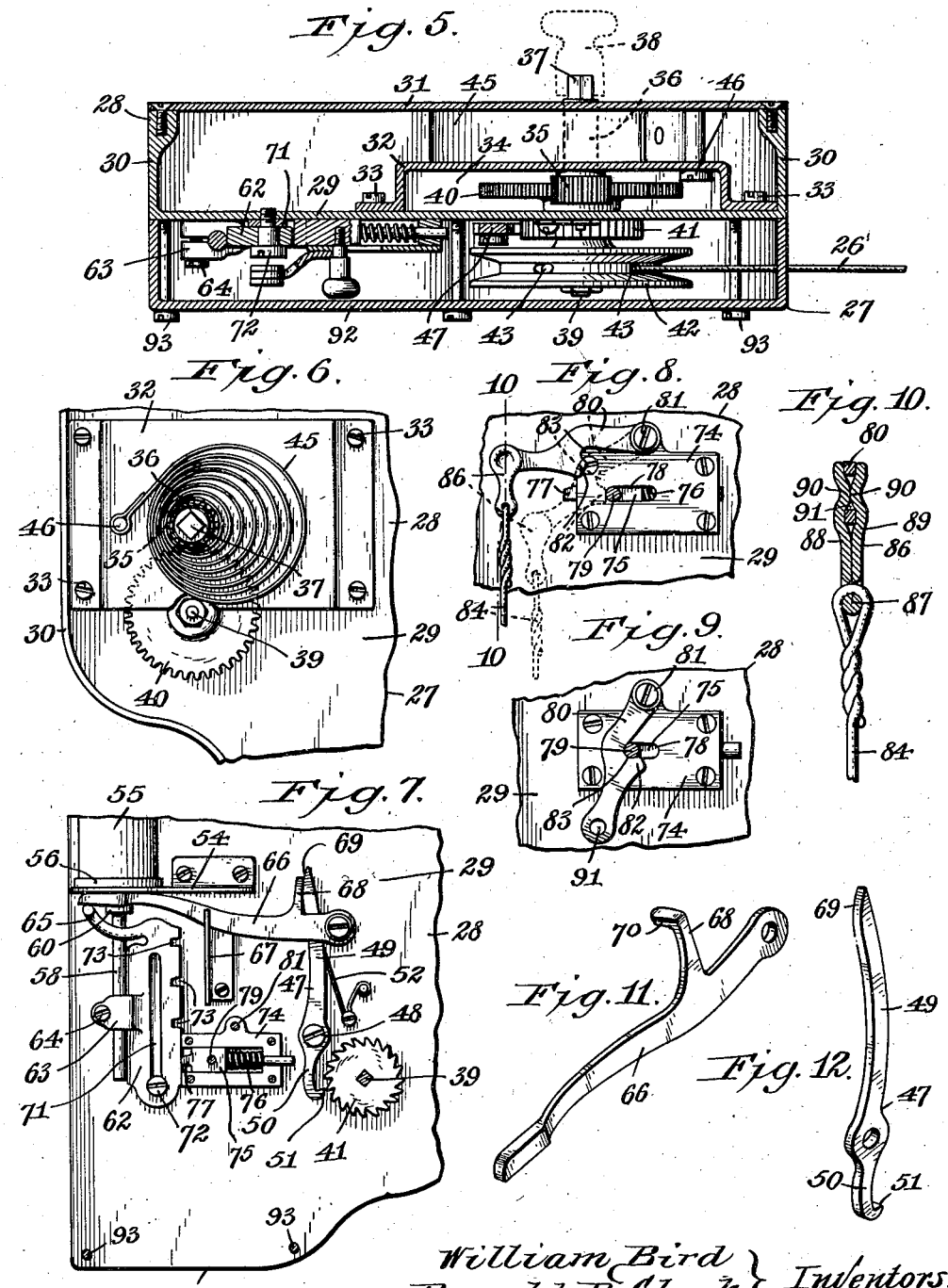

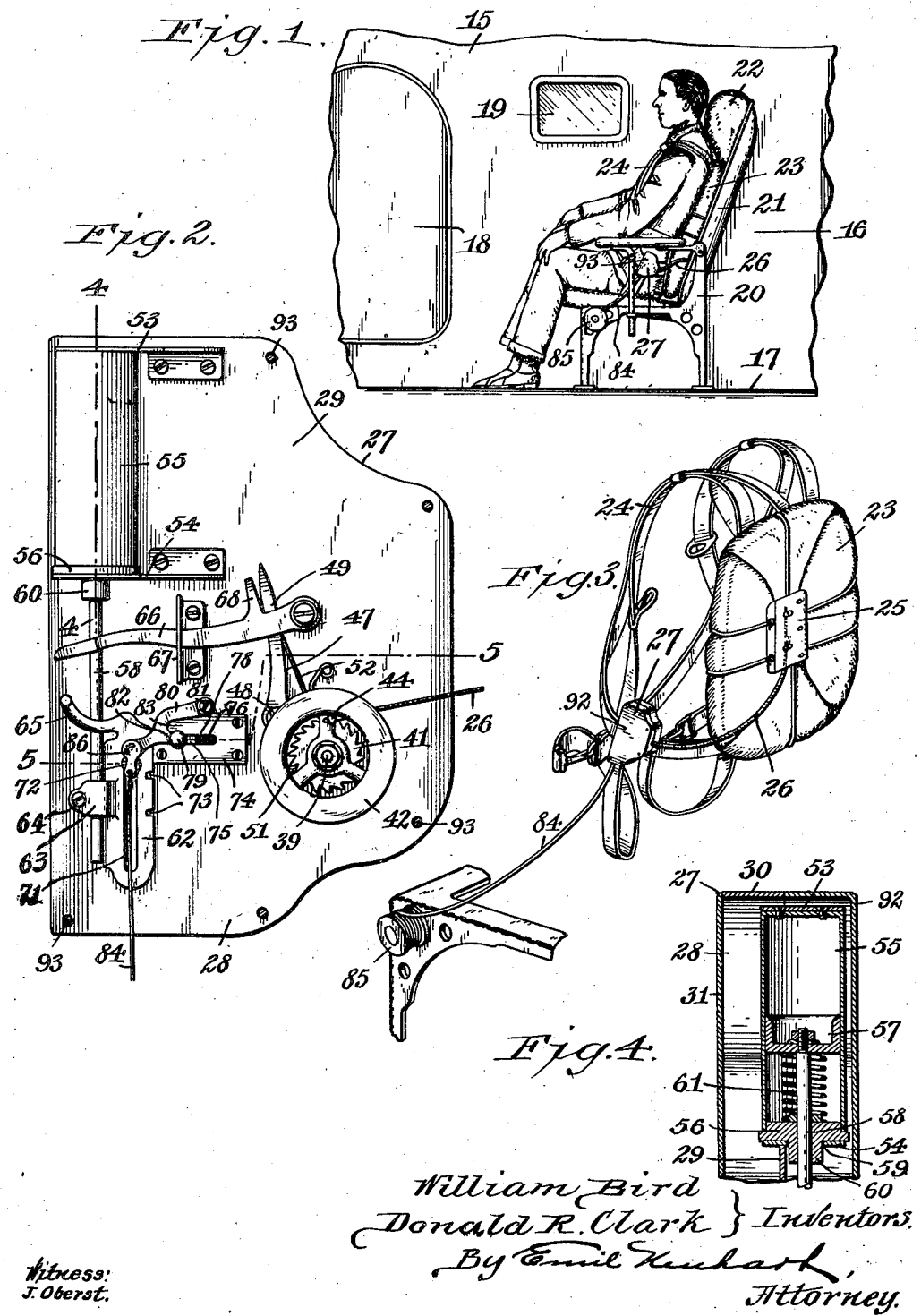

Patented Apr. 19, 1938

2,114,897

UNITED STATES PATENT OFFICE 2,114,897

TIME CONTROLLED PARACHUTE RELEASE DEVICE

William Bird, Buffalo, and Donald R. Clark, Amherst, N. Y.

Application February 6, 1936, Serial No. 62,644

7 Claims. (Cl. 244—150)

Our invention relates to improvements in time-controlled release-mechanism designed to operate parachutes attached to occupants of airplanes or employed for delivering packages, mail, etc., or used for discharging freight, and ammunition, artillery, or other equipment used in warfare.

The primary object of our invention is to provide simple and efficient mechanism for releasing parachutes, whereby certain difficulties now encountered are fully obviated.

Another object of our invention is to provide means for safely delivering passengers, or large or small objects, from an airplane, with assurance that the passengers or the objects will be safely delivered onto the ground within a comparatively small predetermined area.

Another object of our invention is to provide time-controlled release mechanism for parachute-packs, whereby assurance is had that a person leaving an airplane in flight, willingly, unwillingly, or unconsciously, will be safely delivered to the ground without any possibility of the parachute, while opening or after being opened, becoming entangled with any portion of the airplane.

Another object of our invention is to provide improved time-controlled release mechanism whereby the time at which the parachute is permitted to open may be accurately predetermined, such time being governed by controlling-mechanism adjustable to vary the time according to the circumstances of flight or the conditions under which the user leaves the airplane.

Another object of our invention is to provide release mechanism which is absolutely reliable, durable, and inexpensive in construction, and comparatively simple in character; and to provide a time-controlled release device for parachutes which can be operated automatically or manually, as desired, and in which each individual user can set the time-controlling device to meet his individual desires or requirements, according to the ability possessed in effecting a jump from an airplane.

With the above and other objects to appear hereinafter, our invention consists in the novel timed releasing-mechanism wherein provision is made for a lapse of time before the parachute-pack can be opened to release the parachute, and wherein the extent or range of drop made by a person in a descent from the airplane is governed by improved time-controlled means, which may be varied in action to cause opening of the parachute at varied distances from the airplane in the descent of the person jumping, or being pushed or thrown therefrom.

The invention also consists in the novel features of construction, and in the arrangement and combination of parts to be herein described and more particularly pointed out in the subjoined claims.

In the drawings:

Fig. 1 is a view of a portion of the interior of an airplane showing a passenger seated therein and a parachute-pack strapped to the passenger and equipped with our improved invention.

Fig. 2 is a front elevation of our improved time-controlled release-device with the cover removed therefrom, the screws holding the cover to the casing of the device being shown in section.

Fig. 3 is a detached perspective view of a parachute pack, a harness for the same to which our improved time-controlled release-device is applied, and connection between said device and a fixed portion of the airplane, preferably a portion of the seat to be occupied by the passenger or other person using the parachute pack.

Fig. 4 is a vertical section taken on line 4—4, Fig. 2, with the cover of the casing applied thereto.

Fig. 5 is a cross section taken on line 5—5, Fig. 2, with the cover of the casing applied thereto.

Fig. 6 is a rear view of the motor or power mechanism as seen when removing the back plate of the casing.

Fig. 7 is a view of a portion of the front of the casing proper, the view being similar to that of Fig. 2, and showing the cord or cable reel removed from its shaft and the shaft shown in section, the parts being in operated positions.

Fig. 8 is a front view of the locking-mechanism and the adjacent portion of the release-mechanism associated therewith; the thumb-piece of the lock-catch by means of which it is manually set being shown in section and the lock-catch being illustrated in locking position with the lock-engaging element of the release-mechanism disengaged therefrom.

Fig. 9 is a similar view showing the lock-engaging element after having actuated the lock-catch and moved to and retained the same in unlocked position.

Fig. 10 is an enlarged vertical section taken on line 10—10, Fig. 8.

Fig. 11 is a detached perspective view of the trip-lever by means of which the motor or power mechanism is released for action.

Fig. 12 is a detached perspective view of the ratchet detent-lever by means of which the motor or power mechanism is locked against actuation.

In the drawings we have illustrated our invention as adapted for use in connection with passengers, pilots, and attendants traveling in an airplane, and while we have applied our device directly to the harness to which the parachute pack is attached, the application of the device may be otherwise made, or it may be applied directly to the individual or carried by the same.

When delivering objects of any kind, whether large or small, the device may be attached to such objects in the same manner as shown attached to the harness in the accompanying drawings.

The application of our improved invention shown in the drawings is to be considered as illustrative only, and as shown, the reference numeral 15 designates a portion of an airplane, 16 one of the side walls of the cabin, 17 the bottom, 18 a door, and 19 a window. 20 designates a seat of a kind designed for passenger use, such seat usually having a pocketed back 21 on which, if desired, a head rest 22 may be provided which extends forwardly from the back. In the pocket beneath the head rest the parachute-pack 23 may be positioned. When the passenger desires to have the parachute-pack attached to him, it will fit into the pocket of the back 21 underneath the head rest and will be secured to him by means of a harness 24 of the general type shown in Fig. 3. These harnesses vary in arrangement and construction and for pilots are of a different form, due to the fact that the parachute-pack is employed by the pilot as a seat cushion. In both cases, however, the pack includes a parachute, not shown, but of course understood to be attached to a portion of the pack-covering, which opens up upon actuation of common retainer-means 25.

We have not considered it necessary to illustrate the parachute, the details of the pack-covering, the manner of attaching the parachute to the pack-covering, nor the details of the retainer-means whereby the flaps or folds of the pack-covering are disconnected and allowed to open up, as this is well known in the art. In all cases, however, the retainer-means 25 is actuated by a pull cord or cable, such as 26, which cord or cable may, in its broader aspect, be termed a serving medium. The parts thus far described form no part of our invention and may vary in form, appearance, and construction.

Each passenger, however, may be supplied with one of our improved time-controlled release-devices, and in the drawings we have designated the device by the numeral 27 and show the same attached to the side of the harness 24. The device includes a casing 28 having a front wall 29, edge walls 30, and a removable rear wall or plate 31. To the rear of the front wall 29 of this casing a bracket 32 is secured by means of screws 33 or otherwise. This bracket is so formed that a pocket 34 is provided between the same and the front wall 29 of the casing, in which is located a pinion 35 fastened to a shaft 36 journaled in said bracket and in the removable rear wall or plate 31, beyond which latter it is extended rearwardly to provide a projecting portion 37. This projecting portion is preferably of square formation for application thereto of a key 38, shown in dotted lines in Fig. 5.

Journaled in the front wall 29 of the casing is a shaft 39 on which a gear wheel 40 is mounted, which extends upwardly into the pocket 34 and is in mesh with the pinion 35. Shaft 39 extends forwardly beyond the front wall of the casing 28 and has a ratchet wheel 41 secured thereto, in front of which is secured on the shaft 39, a cord or cable reel 42 to which the outer end of the pull cord or cable 26 is secured. This cord or cable may be fully unwound from the reel when the parts of the device are in normal position or set condition, or it may be partly wound up on the reel, as may be desired. In either case, however, it is maintained in slack condition. The rim of this reel is provided with a tangential opening 43 through which the cord is passed, and it is knotted or provided with an enlargement 44 at its extremity which is in engagement with the inner face of said rim, as clearly shown in Fig. 2. If desired, this rim may have several of such openings, as clearly shown in Fig. 5, so that the cord or cable 26 may be attached thereto at various points in its circumference, thus enabling the device to be located in any position with relation to the retainer means 25 on the parachute-pack and cause an effective direct pulling action thereon. The power for winding up the ratchet wheel and the cord or cable reel 42, through the medium of the pinion 35 and gear wheel 40, is furnished by a clock-spring 45 which has one end secured to the shaft 36 and its other end fastened to a pin 46 or some other fixed point on the casing.

On the outer face of the front wall 29 of the casing a ratchet detent-lever 47 is arranged, said lever being pivotally secured to said wall between its ends, as at 48, thus providing a long arm 49 extending upwardly from its pivotal point and a short arm 50 extending downwardly therefrom, the short arm having a ratchet nose 51 angularly-disposed thereon for engagement with the teeth of the ratchet wheel 41 and being held in engagement with said teeth by a trigger or other spring 52 fastened to the front wall 29 of the casing and bearing against the long arm 49 of the ratchet detent-lever. As viewed in Figs. 2 and 7, said spring tends to force the long arm of said lever to the left, while the short arm thereof is forced to the right to engage the ratchet nose 51 with one of the teeth of the ratchet wheel 41.

Fastened to the outer surface of the front wall 29 of the casing, by means of brackets 53, 54 is a cylinder 55, the cylinder being provided with a removable head 56 at its lower end to enable a piston 57 to be inserted thereinto; said piston having slidable clearance with respect to the peripheral wall of the cylinder 55 and being provided with a piston rod 58 which extends axially through said removable head and projects a distance downwardly therefrom in front of the front wall 29 of the casing. The brackets 53 and 54, respectively, engage the upper and lower ends of the cylinder, the upper bracket being secured to the cylinder wall and the lower bracket bearing against the underside of the removable head 56. The lower bracket is provided with a comparatively large opening 59 through which a boss 60 on said head extends. By providing the head with this boss an extended slide surface is provided for the piston rod 58. Between the piston 57 and the removable head 56 of the cylinder, an expansion spring 61 is interposed, said spring surrounding the piston rod and bearing at one end against said piston and at the other end against said removable head, said spring serving, when fully expanded, to normally retain the piston in elevated position.

A time-regulating element is secured to the piston rod 58 near its lower end and it is in the form of a bar 62 having a split laterally-extending lug 63 thereon which is provided with an opening to receive said piston rod, as clearly shown in Fig. 5; the slit formed in said lug extending outwardly from the opening receiving said piston rod, and the rod being clamped in said lug by means of a screw 64 passed through the front portion of said split lug and threaded into the rear portion thereof. Extending laterally and upwardly from the time-regulating element or bar 62 is a trip arm 65 which engages the outer end of a trip-lever 66 pivoted at its inner end to the front wall 29 of the casing. Said trip-lever extends in front of the long upwardly-extending arm 49 of the ratchet detent-lever 47 and is passed through a slotted guide 67 secured to said front wall, thus restricting movement of said trip-lever to true vertical oscillatory movement. This trip-lever has an upstanding arm 68 adjacent the upper end of the ratchet-lever, and the adjacent edge of said lever is curved, as at 69, for engagement with an inwardly-extending lip 70 formed on said upstanding arm, shown in Fig. 11.

While the extended slide surface provided by the boss 60 is designed to assure perfect vertical movement of the piston 57 within the cylinder 55, we prefer to additionally guide the piston rod 58 by forming in the time-regulating element or bar 62 a vertical slot 71 through which is passed a shouldered screw 72 which is threaded into the front wall 29 of the casing. By providing an extended boss such as that through which the piston rod 58 slides and forming the slot 71 in the time-regulating element or bar 62, assurance is had that the axial position of the piston 57 within the cylinder 55 will be maintained at all times and proper action of the piston will occur under all operating conditions.

It may here be stated that the cylinder 55 and piston 57 with the spring 61 underneath the latter serve as a dash-pot; and due to the fact that no vent is provided in the cylinder, a definite and predetermined length of time is required for the piston to move upwardly under expansion of said spring during any given degree of movement of said piston, since the air above and beneath the same, or being passed above or beneath the same, must find its escape between the peripheral face of the piston and the inner surface of the cylindrical wall of the cylinder. When the piston is manually lowered within its cylinder by pulling downwardly on the piston rod to cause compression of the spring 61, we plan to lock the piston rod in any of several lowered positions to which it may be drawn, and for this purpose we provide the time-regulating element or bar 62 along the vertical edge thereof distant from the piston rod with a series of notches 73 which are to be engaged by a part of locking-mechanism, comprising a housing 74 secured to the front wall 29 of the casing adjacent said time-regulating element or bar 62 and having a lock-latch 75 slidable therein, behind which a spring 76 is located, the outer end 77 of said lock-latch being of a size to fit in any of said notches 73. Therefore, when the lock-latch is projected, as shown in Fig. 8, it will be entered in a notch of the time-regulating element or bar 62, and as this element or bar is securely fastened to the piston rod 58, the latter and the piston 57 within the cylinder 55 will be held in any selected lowered position.

The front wall of the lock housing 74 is provided with a slot 78 through which a thumb-piece 79 extends, which is fastened into the lock-latch 75. This thumb-piece may consequently be manually operated, but we prefer to associate therewith suitable release-mechanism which comprises a release lever 80 pivoted at one end to the top of the lock housing 74, as at 81, and extending laterally therefrom when the locking-mechanism engages the time-regulating element 62. This release-lever has on its under side an angular extension 82, forming adjacent thereto a notch 83. The end of the angular extension 82 serves as a cam, in that when swinging the release-lever downwardly, this extension will engage the thumb-piece 79, as clearly shown by dotted lines in Fig. 8, and upon continuing the downward movement thereof will shift said thumb-piece along the slot 78 in the lock housing, with the result that the lock-latch 75 will be drawn inwardly to disengage the narrowed outer end 77 from the time-regulating element or bar 62, whereupon the spring 61, in what may be termed the dash-pot, causes a slow ascent of the piston within the cylinder; this ascent being wholly governed by the ability of the air above the piston to find leakage along the same and enter the space beneath the piston.

As stated, the release-lever 80 forms part of the release mechanism, which includes a release cord or cable 84 held taut by being coiled around a spring-controlled reel 85 revolvably secured to some portion of the airplane, preferably as shown in Fig. 1, to the seat occupied by the passenger furnished with our improved device. This reel is an automatic wind-up or take-up reel of any common construction, and the release cord or cable is so attached at one end to the release-lever 80 that upon exerting a pull of a given number of pounds thereon, necessarily beyond that exerted by merely drawing upon the cord or cable to uncoil the same from the reel, the release-lever will be actuated to disengage the lock-latch 75 from the time-regulating element or bar 62. Connection is made between this cord or cable and the release-lever 80 by means of a friction clip 86, which becomes disengaged from said release lever when the strain on the cord or cable exceeds that required to actuate the release-lever. This increased strain occurs after the lock-latch has been unlocked and fastened in its unlocked position. Any other suitable self-releasing device operative under a given strain may, of course, be substituted for such clip.

This clip 86 comprises a stamping of resilient sheet-metal, shaped as shown in Figs. 2 and 8, and bent midway between its ends, as at 87 (see Fig. 10), to provide two arms 88, 89 which straddle the outer end of the release-lever 80 and have inwardly-projecting nubs or protuberances 90 which are brought into contact or close proximity with each other within an opening 91 formed in the outer end of said lever.

The various parts attached to the outer surface of the front wall 29 of the casing or arranged in front of said wall are enclosed by a flanged cover 92, the edges of the flanges of which bear against the marginal portion of said casing. This cover is secured to the casing by means of screws 93. It is of course understood that openings will be provided in the flange portion of this cover for the passage therethrough of the pull cord or cable 26 and for the release cord or cable 84, and the opening for the pull cord is preferably elongated so that the latter may extend from the reel 85 in any direction, depending on the location of our improved device with respect to the retainer-means 25 of the parachute pack. When the direction of the pull cord is to be changed to meet such conditions, the end thereof adjacent said reel is passed through the opening 43 in the reel most suitable to meet these requirements.

Assuming a flight to be made at a comparatively low altitude, the device would be set for causing the opening of a parachute within the shortest period of time allowed with our device after leaving the airplane; this period of time being determined by the lowermost notch 73 in the time-regulating element or bar 62. As shown in Fig. 7, the time-regulating element or bar is in its most elevated position and release of the release cord or cable has been effected. When this time-regulating element or bar has been only partly lowered to bring the lowermost notch 73 therein into alinement with the reduced outer end 77 of the lock-latch, the spring behind the lock-latch will force the said outer end into said notch. This would result in the trip-lever 66 swinging downwardly under gravity and maintaining contact with the trip arm 65 of the time-regulating element or bar 62. The tension of the spring 61 within the dash-pot would of course be in accordance with the extent of the downward movement given the piston rod and the piston above the spring, and it would require a shorter period of time to effect the tripping movement of said time-regulating element or bar 62 than if lowered to a point where a notch higher in the series were engaged with the lock-latch, as will be made clear hereinafter.

When equipping a passenger with our device, the clock-spring 45 will have been wound up and the ratchet wheel 41 and cord or cable reel 42 held under the strain exerted by said clock-spring; both being retained in wound-up position by engagement of the ratchet detent-lever 47 with the ratchet wheel 41. In this condition the device is set for action with the pull cord or cable 26 slack, and the release cord or cable 84 is detachably fastened to the release-lever 80, the latter, of course, being elevated to allow the expansion spring behind the lock-latch 75 to project the outer end 77 of said latch from the lock housing 74. It will, of course, be understood that the piston of the dash-pot will have been lowered to bring the lock-latch into engagement with the selected notch of the series of notches 73 in said time-regulating element or bar.

Should it be desirable or necessary for a passenger or others to leave the plane, or necessary to effect a forced escape, due to accident, or for some other reason, the passenger moves towards or may pass through the door and the absence of any exterior footing results in his dropping toward the ground. While moving or being moved to the door the release cord or cable 84 will be drawn upon so as to unwind the take-up reel 85. This release cord or cable is of such length, predetermined by the owner of the plane, or perhaps the user, that it will not be fully unwound or paid-out until the passenger has left his seat, has advanced a predetermined distance toward the door, or has fully cleared the door and started his downward descent, but in any case, when said cord or cable is fully unwound and additional force or strain is applied thereto, it will cause the release of the friction clip 86 from the release-lever 80. However, in order to release the friction clip, the force or strain so applied must be sufficient to have first caused the cam-like angular extension 82 on the release-lever to force the lock-latch 75 inwardly against its spring 76, thereby releasing the time-regulating element or bar 62, with the result that the piston in the dash-pot will move upwardly and the piston rod 58 draw the time-regulating element or bar in the same direction. This upward movement is continued under the dash-pot action until the trip arm 65 engages the outer end of the trip-lever 66 and elevates the same to a sufficient extent to cause the inwardly-extending lip 70 thereon to engage the curved upper end of the ratchet detent-lever and move said lever on its pivot to disengage it from the ratchet wheel, whereupon the clock-spring will quickly uncoil and cause a quick or snap rotation of the cord or cable reel 42 under force, thereby winding up the pull cord or cable 26 and exerting sufficient force on the retainer-means 25 of the parachute-pack to operate the same and open the pack-covering so as to permit the parachute to be unfurled or opened up and cause a gradual and safe descent of the passenger to the ground. It is of course understood that the parachute will not unfurl or open up, even though the parachute pack is released, until the user has started his descent.

From the foregoing it will be understood that we have provided a simple and reliable device for safely landing passengers, pilots, and attendants from airplanes, or objects of various kinds, while the airplane is in flight, whether or not the same is under control of a pilot or operator, and that an individual supplied with a parachute-pack, after the device is set for action, can jump from the airplane, or be forcibly ejected therefrom, with assurance that after a predetermined distance in descent, governed by the time-release device, the parachute-pack will be opened and the parachute released. Upon straining the cable or cord 84 beyond the force required to merely unwind the same from its reel, the release-lever 79 will effect disengagement of the lock-latch 74 from the time-regulating element or bar 62, with the result that the dash-pot will be brought into action, the piston of which will gradually move upwardly. During the final portion of such piston movement, regardless of the length or degree of said movement, the trip arm 65 will engage the trip-lever 66 and cause the same to move upwardly on its pivot. Several seconds will be required to effect this co-active operation, the exact time varying according to the notch 83 of the time-regulating element or bar with which the lock-latch 75 is engaged. During the final upward movement of the trip-lever 66, the ratchet detent-lever 47 will be brought into action and gradually cause the release of the nose 51 thereof from the ratchet-wheel 41, whereupon the clock-spring 45 will be released and cause, through the medium of the pinion 35 and the gear wheel 40, a quick or snap wind-up of the pull cord 26, thereby disengaging the locked parts of the retainer-means 25 to cause the parachute-pack to open up so as to release the parachute contained therein.

If it is desired that the delivery be effected in a comparatively small area under control of the pilot or other operator of the airplane, the latter is caused to travel in a comparatively low altitude and the lowermost of the series of notches 73 in the time-regulating element or bar 62 engaged by the lock-latch so that the device will assure a release of the parachute within the minimum space of time, therby subjecting the parachute to the least effect of the air currents while descending through space.

It is of course to be understood that in order to set the device for action, the spring 45 must be strained and retained under strained condition by the ratchet detent-lever 47, also that the dash-pot must be manually lowered and locked in position by manually releasing the release-lever 80 from the thumb-piece 79 of the locking mechanism so as to enable the lock-latch to be engaged with any desired notch in the time-regulating element or bar 62.

While we have shown the time-regulating element or bar 62 provided with three notches, the number of notches in the series may be diminished or increased, or a single notch may be employed if desired. As illustrated in the drawings, we have provided for a release of the clock-spring at selected times within a period of fifteen seconds. When the lock-latch 73 is engaged with the upper or first notch of the series, the piston of the dash-pot and time-regulating element or bar 62 are retained in their lowermost position, with the result that approximately fifteen seconds will be allowed after releasing the lock-latch to release the clock-spring, or motor, as this spring and associated parts may be termed. When the lock-latch is engaged in the intermediate or second notch of the series, approximately ten seconds time will be required for such purpose; and when engaged with the lowermost or third notch of the series, approximately five seconds time will intervene between the unlocking of the piston and time-regulating element or bar 62 and the release of the motor.

By employing a dash-pot structure to regulate the time allowed in descent before causing the parachute to open, all springs, gears, and other intricate parts of time-mechanism now resorted to are obviated and a dash-pot of this construction can be depended upon to require exactly the same length of time to effect a given length of movement or stroke of the piston under action of its spring or some other automatically-operated medium, thereby assuring the opening of the parachute at any point in the descent of a person voluntarily leaving the airplane or a person or object ejected therefrom.

We prefer to more particularly refer to the spring 45 and the parts associated therewith, including the cord or cable reel 42, as cord-straining mechanism: the spring 45, considered by itself as a power motor, the cord or cable reel 85, the cord 84 and the friction clip 86, as release mechanism; and the cylinder 55, with the piston and spring therein associated with the element 62, as time-control or time-controlling mechanism whereby the retaining-means of the parachute-pack is controlled after the release mechanism has caused the time-controlling mechanism to be unlocked.

It is to be understood, it is not necessary that the release of the locking mechanism be effected at the time of descending from the airplane, although this might be highly desirable in many cases. In other cases, such release can be effected while the individual bearing the device is still in the airplane and will have sufficient time to escape therefrom and cause the automatic opening of the parachute after falling clear of the airplane.

In large passenger planes, the cords 84 of the several parachute-packs used can be of varying lengths so that they are released from the lever 80 only as the passengers travel different distances from their respective seats and arrive at the door of the airplane, or such cords may vary so that the release of the same takes place under such strain as can be applied only by the weight of a person dropping through space.

In any event, orderly and regulated descent of all occupants of an airplane can be quickly made, one following another, without possibility of the parachutes coming in contact with the airplane, or with each other.

While we believe the unfurling of a parachute controlled by the descent of the user of the same has decided advantages not heretofore possessed by any means provided for such purposes, we do not wish to limit ourselves to such use, unless so specifically defined in the appended claims.

Having thus described our invention, what we claim is:

1. A time-controlled device for causing a parachute to open, comprising a casing enclosing a power-device having a shaft extending through one wall of said casing, a cylinder mounted on the exterior of said wall, a piston within said cylinder spring-pressed in one direction and having a rod extending through one end of said cylinder, a lock-device for co-action with said rod to hold said piston in desired position within said cylinder so as to govern the extent of movement in its opposite direction, detent-mechanism to prevent actuation of said power-device, a trip-device actuated during the movement of said piston in said first-mentioned direction to release said detent-mechanism, and a cord actuated when said power-mechanism is actuated.

2. A time-controlled device for causing a parachute to open, comprising a power-device, a cylinder mounted in fixed relation to said power-device, a piston within said cylinder spring-pressed in one direction and having a rod extending through one end of said cylinder, said piston being adapted to be moved manually in the opposite direction, a lock-device to hold said piston in manually-moved position within said cylinder, detent-mechanism including a rotatable shaft actuated by said power-device, a trip-device actuated during the movement of said piston in said first-mentioned direction to release said detent-mechanism, and a pull-cord actuated upon rotation of said shaft when said power-mechanism is actuated.

3. A time-controlled device for causing a parachute to open, comprising a casing including a power-spring, a shaft to which said spring is secured, said shaft being manually rotatable in one direction to wind up said spring, a pull-cord actuated under rotation of said shaft in the opposite direction, detent-mechanism including a part rotatable with said shaft to prevent unwinding of said power-spring, and a trip-device actuated during the movement of said piston in its first-mentioned direction to release said detent-mechanism.

4. A time-controlled device for causing a parachute to open, comprising a support, a shaft rotatable in said support, a power-spring secured to said shaft and said support, a ratchet wheel on said shaft, a cylinder mounted on said support, a piston within said cylinder normally spring-pressed to retain the same at the end of its movement in one direction, a piston-rod extending from said piston through one end of said cylinder, a lock-device adapted to lock said piston-rod and piston in selected position after manually moving the same in its opposite direction, a ratchet detent-lever engaging said ratchet wheel, and a trip-device to trip said ratchet detent-lever after predetermined movement of said piston in said first-mentioned direction upon unlocking said lock-device.

5. A time-controlled device for causing a parachute to open, comprising a support, a shaft rotatable in said support, a clock-spring having one end secured to said shaft and its other end secured to said support, a ratchet wheel on said shaft, a cylinder mounted on said support, a piston within said cylinder, a spring to normally retain the same at the end of its movement in one direction, said piston being manually adjustable within said cylinder against the action of said last-mentioned spring, a piston-rod extending from said piston through one end of said cylinder, a lock-device having a lock-bolt movable at a right angle to the axis of said piston-rod, means carried by said piston-rod adapted to be engaged at selective points by said lock-device to retain the piston in adjusted position within said cylinder, a sheave on said shaft, a pull-cord secured to said sheave, a detent-device engaging said ratchet wheel, and a trip-lever adapted to be actuated upon movement of said piston in said first-mentioned direction and cause said detent to be released from said ratchet wheel.

6. A time-controlled device for causing a parachute to open, comprising a casing, a shaft mounted in said casing and having one end projecting outwardly therefrom, a clock-spring within said casing having one end secured to said shaft and its other end to a fixed point, a ratchet wheel on the projecting end of said shaft, a sheave secured to said shaft, a pull-cord fastened to said sheave, a cylinder mounted on the exterior of said casing, a piston within said cylinder having a piston rod extending axially therefrom, a time-regulating element secured to said piston rod, a locking-device to lock said time-regulating element in selective position, a trip-device in the path of said time-regulating element adapted to be actuated thereby, and a detent-device co-operating with said ratchet wheel and normally maintained in engagement with said ratchet wheel, said trip-lever causing actuation of said detent-device to release the same from said ratchet wheel when actuated by said time-regulating element.

7. A time-controlled device including a cylinder, a piston reciprocable within said cylinder and having a piston rod extending outwardly through one end of said cylinder, a spring within said cylinder surrounding said piston-rod and adapted to cause movement of said piston in one direction, said piston and piston-rod being manually movable in the opposite direction, a time-regulating element adjustably secured to said piston-rod and having a series of notches therein, a lock-device having a spring-pressed lock-bolt adapted to selectively enter the notches of said series when said piston rod is manually actuated, and a pivoted release-lever having a cam engaging said lock-bolt to release said time-regulating element and permit said spring to actuate said piston and piston-rod.

WILLIAM BIRD.
DONALD R. CLARK.